US009667342B2

(12) United States Patent
Mizuguchi et al.

(10) Patent No.: US 9,667,342 B2
(45) Date of Patent: May 30, 2017

(54) OPTICAL PHASE NOISE EXTRACTING DEVICE AND OPTICAL PHASE NOISE EXTRACTION METHOD

(71) Applicant: FUJITSU LIMITED, Kawasaki-shi, Kanagawa (JP)

(72) Inventors: Noriaki Mizuguchi, Sapporo (JP); Takahiro Makimoto, Sapporo (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/881,758

(22) Filed: Oct. 13, 2015

(65) Prior Publication Data
US 2016/0142132 A1 May 19, 2016

(30) Foreign Application Priority Data

Nov. 18, 2014 (JP) ................ 2014-234037

(51) Int. Cl.
*H04B 10/079* (2013.01)
*H04B 10/61* (2013.01)

(52) U.S. Cl.
CPC ..... *H04B 10/0795* (2013.01); *H04B 10/6165* (2013.01)

(58) Field of Classification Search
CPC ................ H04B 10/0795; H04B 10/6165
See application file for complete search history.

(56) References Cited

U.S. PATENT DOCUMENTS

2006/0066838 A1\* 3/2006 Dorrer ............... G01M 11/333
356/73.1

FOREIGN PATENT DOCUMENTS

JP 2006-41681 2/2006
JP 2011-182198 9/2011

\* cited by examiner

*Primary Examiner* — Leslie Pascal
(74) *Attorney, Agent, or Firm* — Staas & Halsey LLP

(57) ABSTRACT

An apparatus includes: a first measurer configured to measure first phase data indicating a temporal variation in a phase of a non-transferred signal that is an optical signal modulated by an optical phase modulation scheme and output from a transmitting device to an optical transmission path as the non-transferred signal; a second measurer configured to second phase data indicating a temporal variation in the phase of the optical signal transferred by the optical transmission path as a transferred signal on a side of a receiving device; a generator configured to generate differential data indicating a difference between the first phase data and the second phase data; and an extractor configured to use the differential data to extract, from the optical signal on the side of the receiving device, optical phase noise generated due to the optical transmission path.

6 Claims, 13 Drawing Sheets

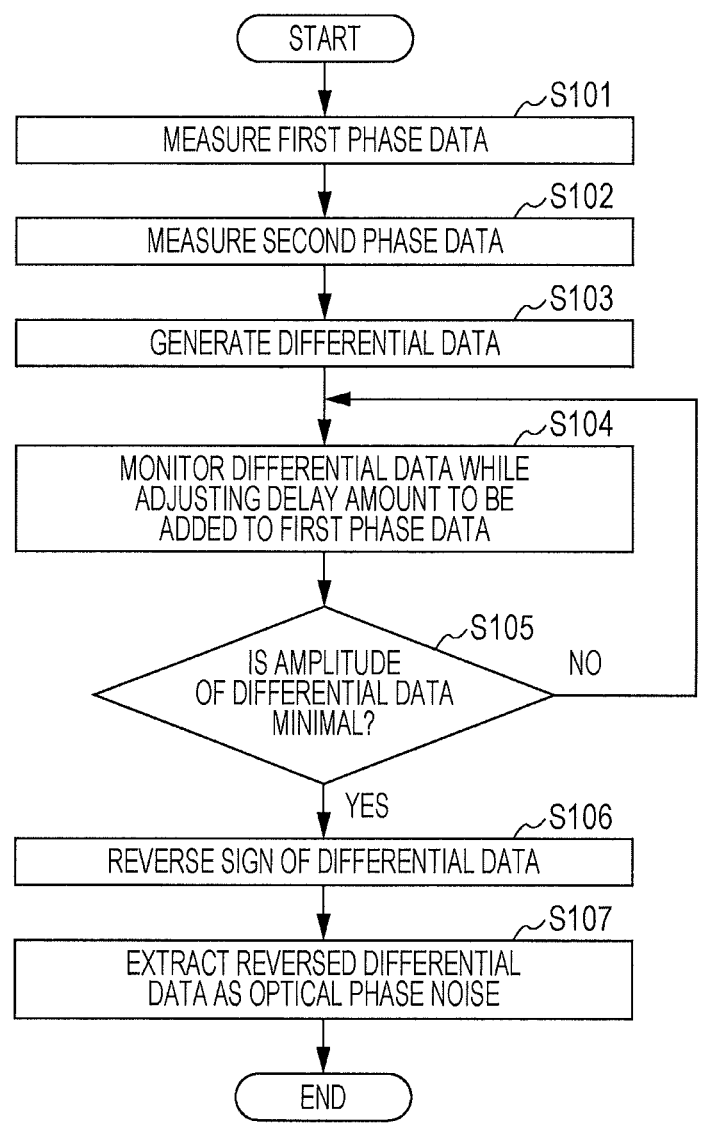

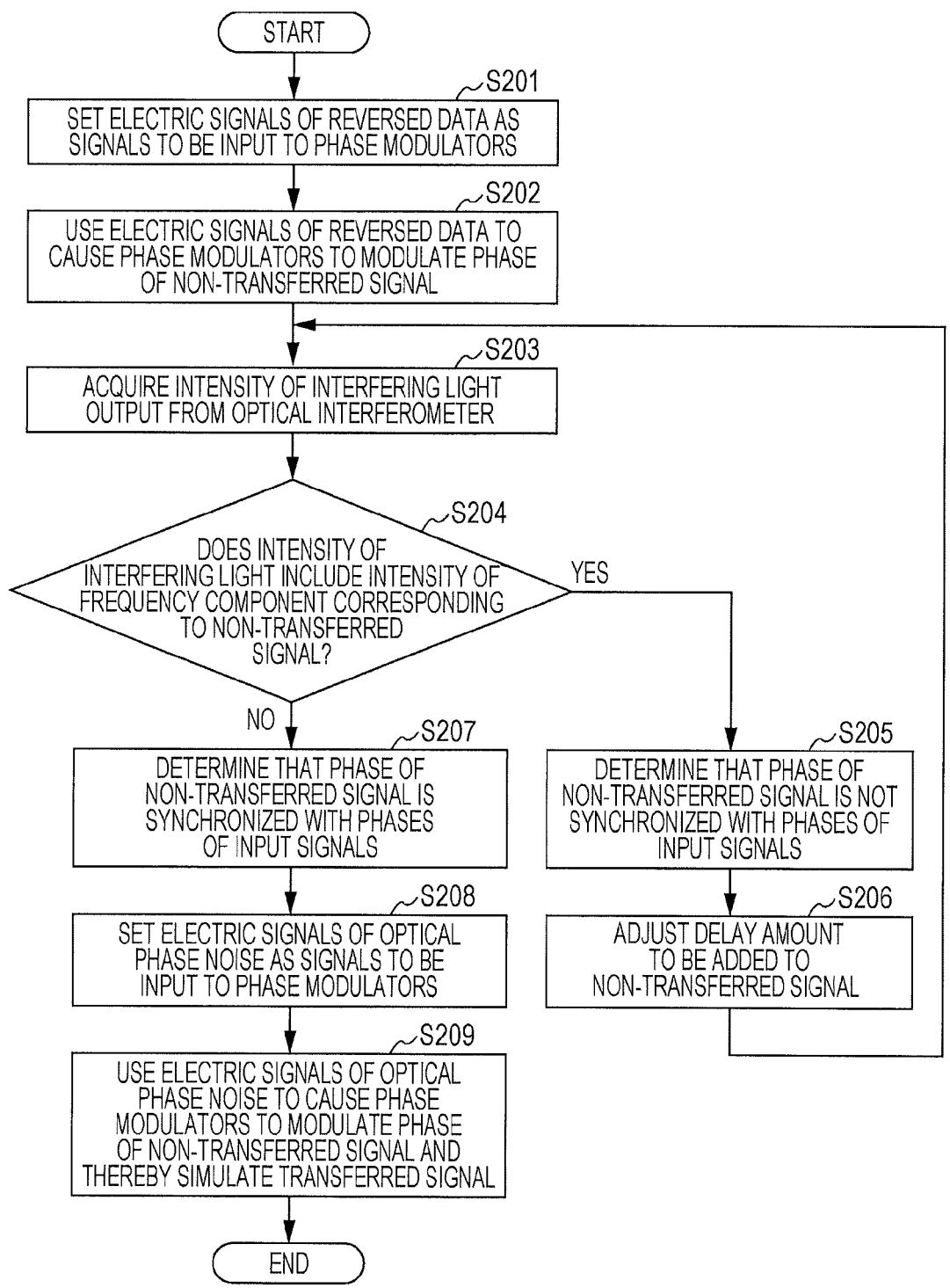

OPTICAL PHASE NOISE EXTRACTING DEVICE AND OPTICAL PHASE NOISE EXTRACTION METHOD

CROSS-REFERENCE TO RELATED APPLICATION

This application is based upon and claims the benefit of priority of the prior Japanese Patent Application No. 2014-234037, filed on Nov. 18, 2014, the entire contents of which are incorporated herein by reference.

FIELD

The embodiment discussed herein is related to an optical phase noise extracting device and an optical phase noise extraction method.

BACKGROUND

A wavelength division multiplexing (WDM) optical transmission system may transmit a large amount of information by multiplexing signal light modulated by various modulation schemes. The modulation schemes for modulating signal light in the WDM optical transmission system include optical phase modulation schemes and the like. The optical phase modulation schemes are methods of transmitting and receiving information by changing phases of light and are used for transceivers with bit rates of approximately 40 Gbps, for example.

The optical phase modulation schemes include a differential phase shift keying (DPSK) modulation scheme and a differential quadrature phase shift keying (DQPSK) modulation scheme. In recent years, a modulation scheme that is referred to as a dual polarization quadrature phase shift keying (DP-QPSK) modulation scheme has been developed. The DP-QPSK modulation scheme enables information to be transmitted and received at approximately 100 Gbps by multiplexing polarized waves, for example.

It is known that, in an optical transmission system that employs an optical phase modulation scheme, when an optical signal modulated by the optical phase modulation scheme is output from an optical transmitter to an optical transmission path, the optical signal transferred by the optical transmission path is deteriorated due to various causes. For example, the optical signal is deteriorated by Amplified Spontaneous Emission (ASE) light of an optical amplifier installed in the optical transmission path. In addition, the optical signal is deteriorated by chromatic dispersion, polarization mode dispersion, a polarization-dependent loss, state-of-polarization rotation, and the like. Furthermore, it is known that the optical signal is deteriorated by a nonlinear optical effect of the optical transmission path. The nonlinear optical effect of the optical transmission path is self-phase modulation (SPM), cross-phase modulation (XPM), four-wave mixing, or the like, for example.

There is a conventional technique for using a known transfer function to extract optical intensity noise generated due to the ASE light, the chromatic dispersion, the polarization mode dispersion, the polarization-dependent loss, the state-of-polarization rotation, and the like that are the causes of the deterioration of the optical signal.

An example of related art is Japanese Laid-open Patent Publication No. 2011-182198.

In the conventional technique, however, the extraction of optical phase noise generated due to the nonlinear optical effect of the optical transmission path is not considered. Thus, there has been a demand to accurately extract the optical phase noise generated due to the nonlinear optical effect of the optical transmission path.

Techniques disclosed herein were devised in consideration of the aforementioned facts, and it is an object of the techniques disclosed herein to provide an optical phase noise extracting device and an optical phase noise extraction method that enable optical phase noise generated due to a nonlinear optical effect of an optical transmission path to be accurately extracted.

SUMMARY

According to an aspect of the embodiments, an apparatus includes: a first measurer configured to measure first phase data indicating a temporal variation in a phase of a non-transferred signal that is an optical signal modulated by an optical phase modulation scheme and output from a transmitting device to an optical transmission path as the non-transferred signal; a second measurer configured to second phase data indicating a temporal variation in the phase of the optical signal transferred by the optical transmission path as a transferred signal on a side of a receiving device; a generator configured to generate differential data indicating a difference between the first phase data and the second phase data; and an extractor configured to use the differential data to extract, from the optical signal on the side of the receiving device, optical phase noise generated due to the optical transmission path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a flowchart of a procedure for a process of extracting optical phase noise by the optical phase noise extracting device according to the embodiment; and FIG. 14 is a flowchart of a procedure for a process of simulating a transferred signal by the optical phase noise extracting device according to the embodiment.

DESCRIPTION OF EMBODIMENTS

Hereinafter, an embodiment of an optical phase noise extracting device disclosed herein and an optical phase noise extraction method disclosed herein is described in detail based on the accompanying drawings. The techniques disclosed herein, however, are not limited to the embodiment.

Figure 1:
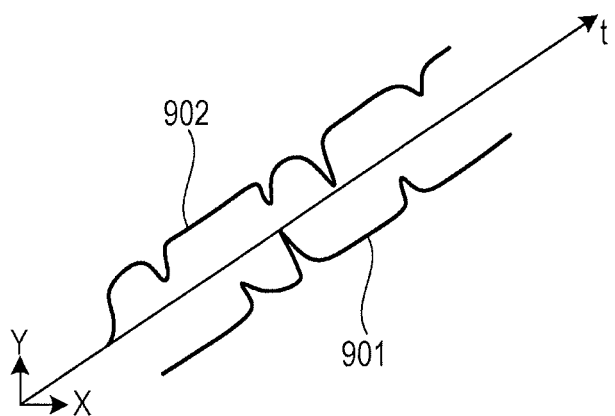
FIG. 1 is a diagram illustrating an optical signal modulated by a DP-QPSK modulation scheme.

First, a technique that is based on the optical phase noise extracting device disclosed herein is described with reference to FIGS. 1 to 3. FIG. 1 is a diagram illustrating an optical signal modulated by the DP-QPSK modulation scheme. As illustrated in FIG. 1, the optical signal modulated by the DP-QPSK modulation scheme includes two light components that are waves 901 and 902 polarized in directions perpendicular to each other. The polarized wave 901 and the polarized wave 902 are referred to as an X polarized wave and a Y polarized wave, respectively. The polarized wave 901 and the polarized wave 902 may have different phases and may carry different information items, respectively. It is known that, in an optical transmission system that employs an optical phase modulation scheme including the DP-QPSK modulation scheme, when an optical signal modulated by the optical phase modulation scheme is output to an optical transmission path, the optical signal transferred by the optical transmission path is deteriorated by various causes.

Figure 2:
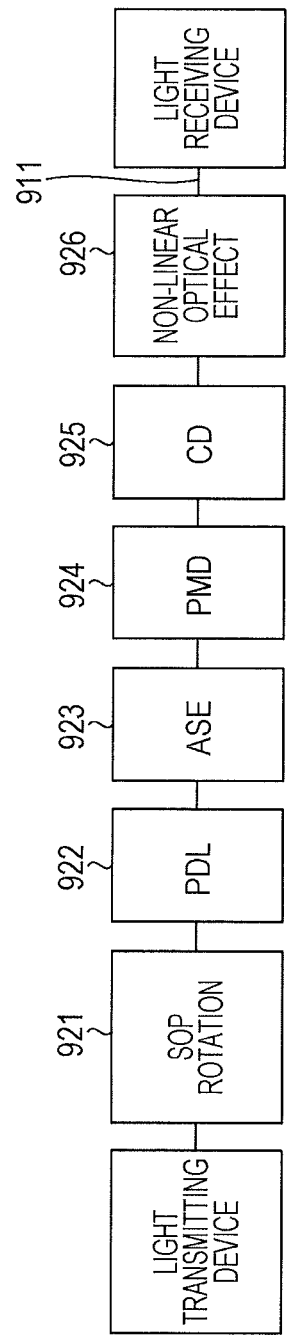
FIG. 2 is a diagram illustrating elements that deteriorate an optical signal modulated by an optical phase modulation scheme.

FIG. 2 is a diagram illustrating elements that deteriorate the optical signal modulated by the optical phase modulation scheme. As illustrated in FIG. 2, when an optical signal (hereinafter merely referred to as "optical signal") 911 modulated by the optical phase modulation scheme is output from a light transmitting device to an optical transmission path that connects the light transmitting device and a light receiving device to each other, the optical signal 911 transferred by the optical transmission path is deteriorated by elements 921 to 926. The element 921 is state-of-polarization (SOP) rotation. The element 922 is a polarization-dependent loss (PDL). The element 923 is Amplified Spontaneous Emission light from an optical amplifier installed in the optical transmission path. The element 924 is polarization mode dispersion (PMD). The element 925 is chromatic dispersion (CD). The element 926 is a nonlinear optical effect of the optical transmission path. The nonlinear optical effect of the optical transmission path is self-phase modulation (SPM), cross-phase modulation (XPM), four-wave mixing, or the like. Noise of various types are superimposed, due to the elements 921 to 926, on the optical signal 911 transferred by the optical transmission path.

Figure 3:
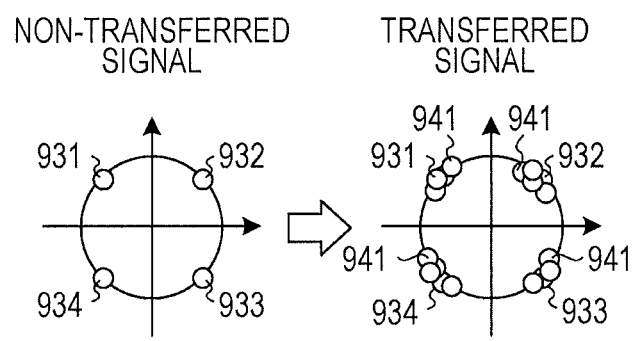
FIG. 3 is a diagram illustrating noise generated in transmission of an optical signal.

FIG. 3 is a diagram illustrating the noise generated in transmission of the optical signal. On the left side of FIG. 3, the diagram illustrates signal points of a non-transferred signal on a two-dimensional complex plane, while the non-transferred signal is an optical signal modulated by the optical phase modulation scheme and output to the optical transmission path. On the right side of FIG. 3, the diagram illustrates signal points of the optical signal transferred by the optical transmission path on a two-dimensional complex plane. It is assumed that the DP-QPSK modulation scheme is used as the optical phase modulation scheme. In addition, it is assumed that the signal points illustrated in FIG. 3 are signal points of an X polarized wave included in the optical signal.

As illustrated on the left side of FIG. 3, the non-transferred signal includes the four signal points 931 to 934 arranged on a circle depicted on the complex plane. On the other hand, as illustrated on the right side of FIG. 3, the transferred signal includes multiple noise components 941 generated around each of the four signal points 931 to 934. Noise that is among the multiple noise components 941 and generated at positions separated from the signal points and located in a radial direction of the circle depicted on the complex plane is referred to as "optical intensity noise". In addition, noise that is among the multiple noise components 941 and generated at positions separated from the signal points and located in a circumferential direction of the circle depicted on the complex plane is referred to as "optical phase noise". The optical intensity noise is generated mainly due to ASE light, chromatic dispersion, polarization mode dispersion, a polarization-dependent loss, state-of-polarization rotation, and the like that are the elements that deteriorate the optical signal. The optical phase noise is generated mainly due to the nonlinear optical effect of the optical transmission path that is the element that deteriorates the optical signal. Although the optical phase noise and the optical intensity noise that are generated around the signal points of the X polarized wave included in the optical signal are illustrated on the right side of FIG. 3, optical phase noise and optical intensity noise are generated around signal points of a Y polarized wave, similarly to the noise generated around the X polarized wave.

The conventional technique for using a known transfer function to extract optical intensity noise generated due to ASE light, chromatic dispersion, polarization mode dispersion, a polarization-dependent loss, state-of-polarization rotation, and the like already exists. In the conventional technique, however, the extraction of optical phase noise generated due to the nonlinear optical effect is not considered. Thus, in the embodiment, a method of extracting optical phase noise generated due to the nonlinear optical effect is presented.

Embodiments

Figure 4:
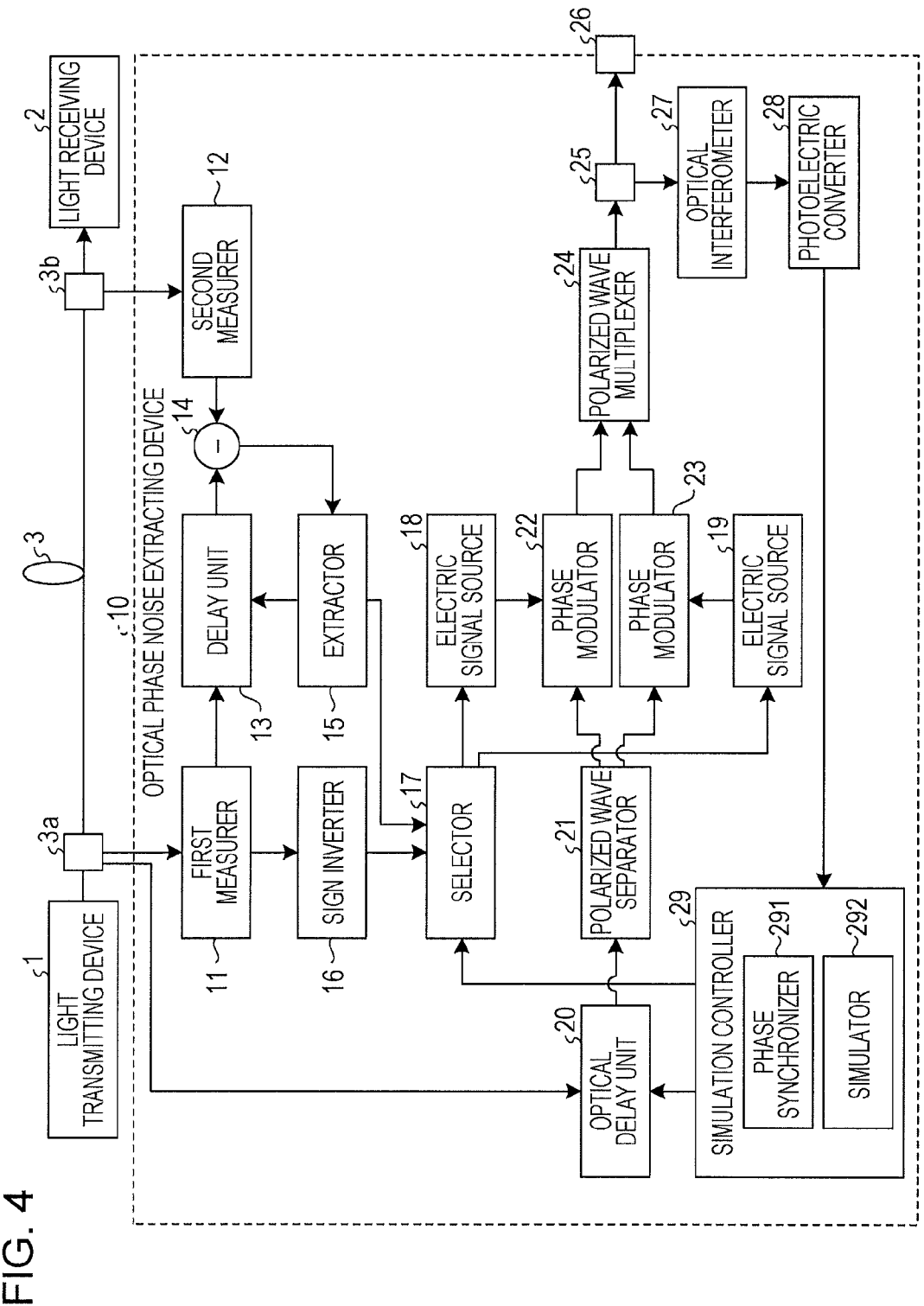
FIG. 4 is a diagram illustrating an example of a configuration of a transmission system that includes an optical phase noise extracting device according to an embodiment.

First, an example of a configuration of a transmission system that includes an optical phase noise extracting device according to the embodiment is described with reference to FIG. 4. FIG. 4 is a diagram illustrating the example of the configuration of the transmission system that includes the optical phase noise extracting device according to the embodiment. The transmission system illustrated in FIG. 4 includes a light transmitting device 1, a light receiving device 2, an optical transmission path 3, and an optical phase noise extracting device 10.

The light transmitting device 1 modulates the phase of an optical signal by an optical phase modulation scheme and outputs the phase-modulated optical signal to the optical transmission path 3. The embodiment assumes that the DP-QPSK modulation scheme is used as the optical phase modulation scheme. In addition, the optical signal whose phase is modulated by the light transmitting device 1 is merely referred to as an "optical signal". The embodiment assumes that the optical signal has predetermined periodicity. The optical signal that has the predetermined periodicity is a pseudo-random bit sequence (PRBS) signal, for example.

The light receiving device 2 receives the optical signal output by the light transmitting device 1 through the optical transmission path 3.

The optical transmission path 3 connects the light transmitting device 1 and the light receiving device 2 to each other and transfers the optical signal output by the light transmitting device 1 to the light receiving device 2. The optical transmission path 3 includes an optical fiber, an optical amplifier installed in the optical fiber, and the like. The optical transmission path 3 includes an optical branching unit 3a at an end of the optical transmission path 3 on the side of the light transmitting device 1 and includes an optical branching unit 3b at the other end of the optical transmission path 3 on the side of the light receiving device 2. The optical branching unit 3a guides, to the optical phase noise extracting device 10, a non-transferred signal that is an optical signal output from the light transmitting device 1 to the optical transmission path 3. The optical branching unit 3b guides, to the optical phase noise extracting device 10, the optical signal transferred by the optical transmission path 3.

The optical phase noise extracting device 10 includes a first measurer 11, a second measurer 12, a delay unit 13, a subtractor 14, an extractor 15, a sign inverter 16, and a selector 17. The optical phase noise extracting device 10 also includes an electric signal source 18, an electric signal source 19, an optical delay unit 20, a polarized wave separator 21, a phase modulator 22, a phase modulator 23, a polarized wave multiplexer 24, an optical branching unit 25, an output port 26, an optical interferometer 27, a photoelectric converter 28, and a simulation controller 29. The optical delay unit may utilize an optical delay circuit such as an optical fiber.

The first measurer 11 measures first phase data indicating a temporal variation in the phase of the non-transferred signal that has been guided by the optical branching unit 3a and is yet to be transferred by the optical transmission path 3. The first measurer 11 outputs the measured first phase data to the delay unit 13 and the sign inverter 16.

The second measurer 12 measures second phase data indicating a temporal variation in the phase of the signal transferred by the optical transmission path 3 and guided by the optical branching unit 3b. The second measurer 12 outputs the measured second phase data to the subtractor 14.

Figure 5:
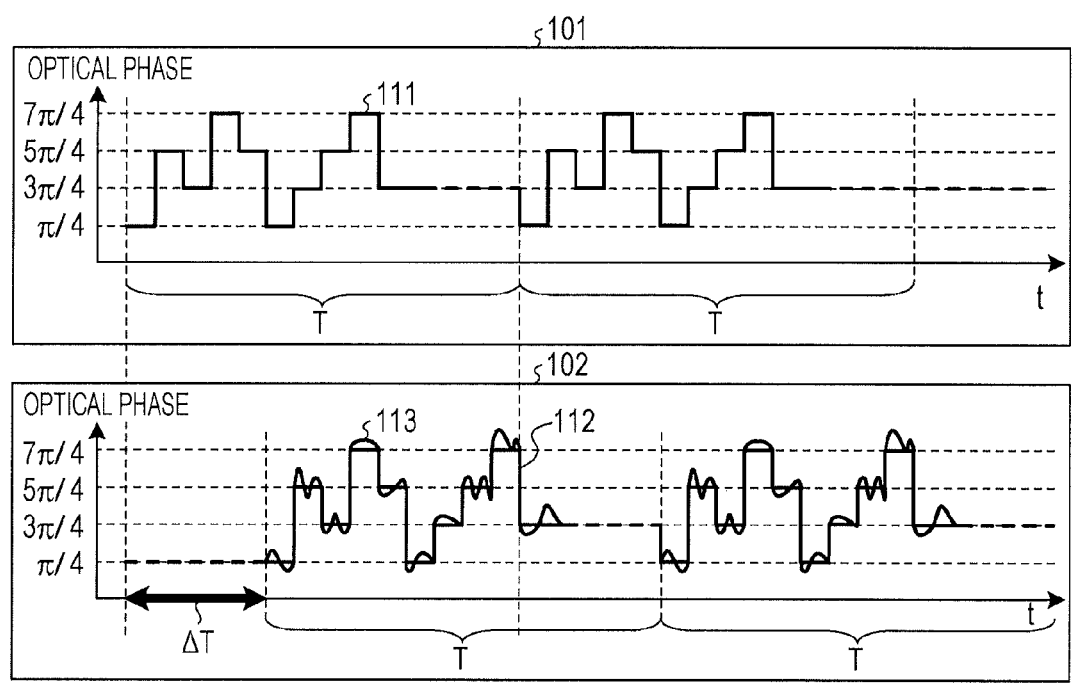
FIG. 5 is a diagram illustrating relationships between first phase data and second phase data.

FIG. 5 is a diagram illustrating relationships between the first phase data and the second phase data. In FIG. 5, an upper table indicates the first phase data 101, and a lower table indicates the second phase data 102. In the first phase data 101 and the second phase data 102, the abscissas indicate time, and the ordinates indicate the phases. As illustrated in FIG. 5, cycles T of a temporal variation 111 in the phase of the first phase data 101 are the same as cycles T of a temporal variation 112 in the phase of the second phase data 102. In addition, the temporal variation 112 in the phase of the second phase data 102 is delayed by a delay amount ΔT from the temporal variation 111 in the phase of the first phase data 101. Furthermore, in the temporal variation 112 in the phase of the second phase data 102, a temporal variation 113 in the phase of optical phase noise superimposed on the transferred signal appears.

Return to the description of FIG. 4. The delay unit 13 adds a delay amount to the first phase data measured by the first measurer 11. The delay amount to be added to the first phase data by the delay unit 13 is adjusted by the extractor 15 described later. The delay unit 13 outputs the first phase data having the delay amount added thereto to the subtractor 14.

The subtractor 14 generates differential data indicating the difference between the first phase data and the second phase data. Specifically, the subtractor 14 subtracts the second phase data from the first phase data having the delay amount added thereto by the delay unit 13 and thereby generates the differential data. The subtractor 14 is an example of a generator. The subtractor 14 outputs the generated differential data to the extractor 15.

The extractor 15 uses the differential data to extract, from the transferred signal, the optical phase noise generated due to a nonlinear optical effect of the optical transmission path 3. Specifically, the extractor 15 monitors the differential data input from the subtractor 14 while adjusting the delay amount to be added to the first phase data by the delay unit 13. Then, if the amplitude of the differential data is minimal, the extractor 15 extracts the optical phase noise by reversing the sign of the differential data. The extractor 15 outputs the extracted optical phase noise to the selector 17.

Figure 6:
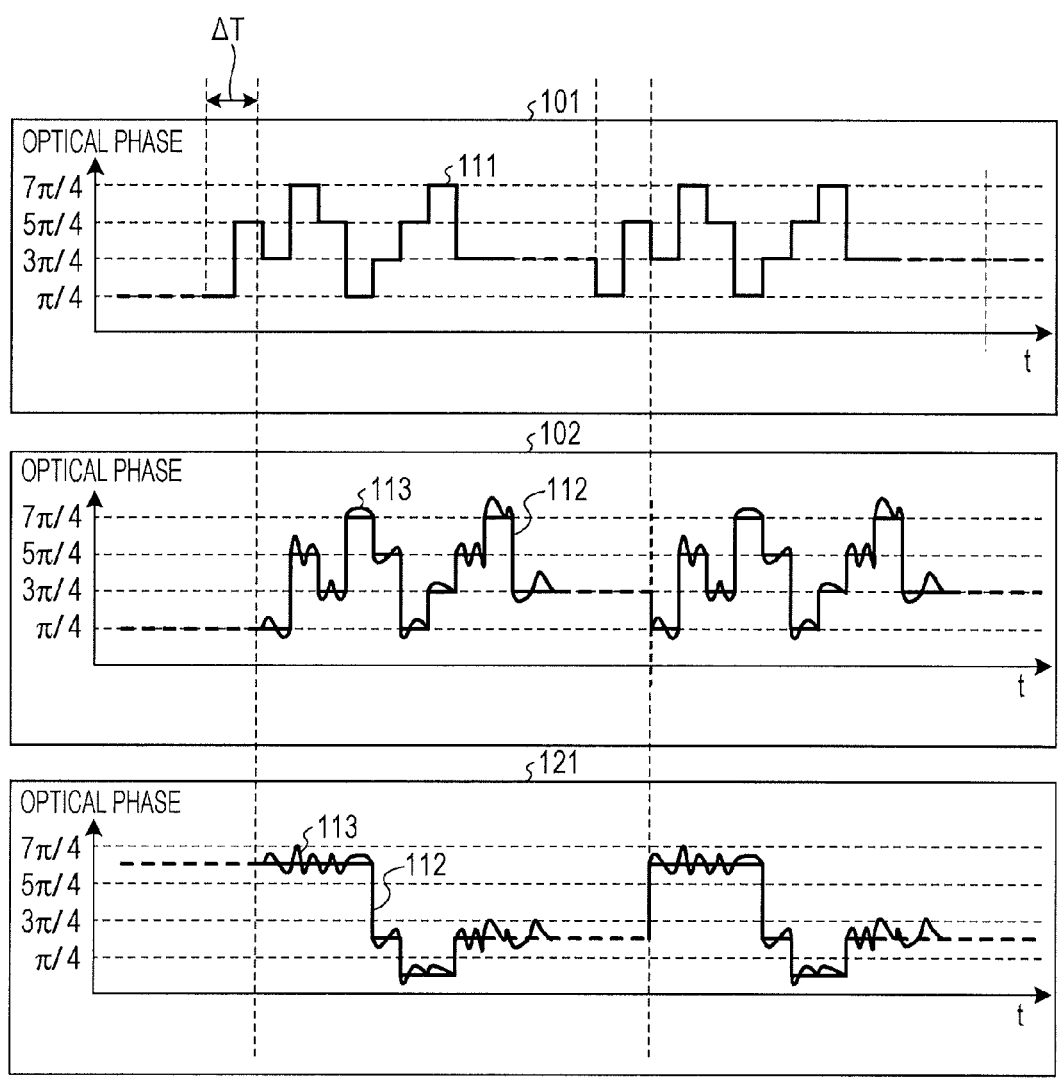
FIG. 6 is a diagram illustrating a state in which the amplitude of differential data is not minimal.
Figure 7:
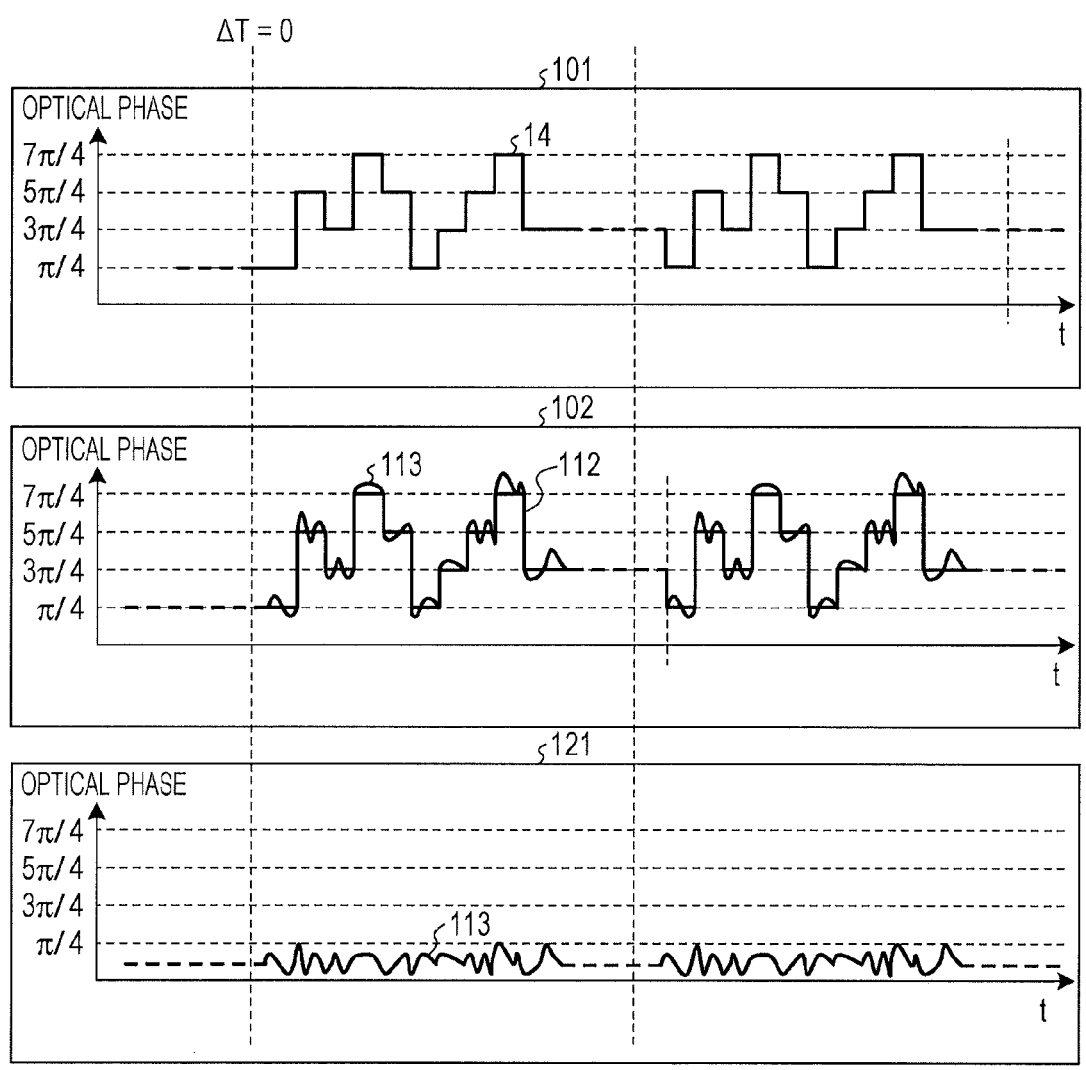
FIG. 7 is a diagram illustrating a state in which the amplitude of the differential data is minimal.

An example of the extraction of the optical phase noise by the extractor 15 is described below. FIG. 6 is a diagram illustrating a state in which the amplitude of the differential data is not minimal. FIG. 7 is a diagram illustrating a state in which the amplitude of the differential data is minimal. When the extractor 15 adjusts the delay amount to be added to the first phase data 101, the delay amount ΔT of the second phase data 102 with respect to the first phase data 101 is reduced, as illustrated in FIG. 6. If the delay amount ΔT of the second phase data 102 with respect to the first phase data 101 is not 0, the differential data 121 that indicates the difference between the first phase data 101 and the second phase data 102 includes the temporal variation 113 in the phase of the optical phase noise and a remaining component of the second phase data 102. Thus, the amplitude of the differential data 121 is a relatively large value that is not minimal.

On the other hand, as illustrated in FIG. 7, if the delay amount ΔT of the second phase data 102 with respect to the first phase data 101 is 0, the temporal variation 112 in the phase of the second phase data 102 is offset by the temporal variation 111 in the phase of the first phase data 101. Thus, the differential data 121 includes only the temporal variation 113 in the phase of the optical phase noise. In this case, the amplitude of the differential data 121 is minimal. Thus, if the amplitude of the differential data 121 is minimal, the extractor 15 may extract only the optical phase noise by reversing the sign of the differential data 121.

If the number of sampling points of the differential data is smaller than a predetermined number, the extractor 15 may execute an interpolation process on the differential data and thereby insert new sampling points between the sampling points of the differential data. As the interpolation process, a known interpolation process such as a spline interpolation process is executed.

Figure 8:
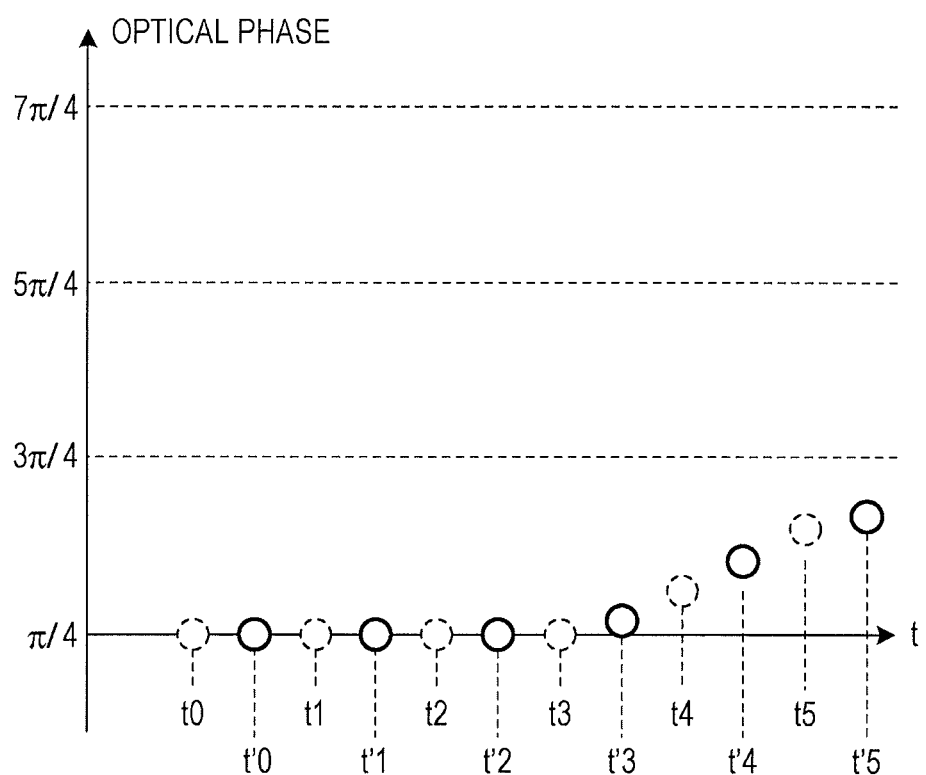
FIG. 8 is a diagram illustrating an example of the differential data subjected to an interpolation process.

FIG. 8 is a diagram illustrating an example of the differential data subjected to the interpolation process. When the extractor 15 executes the interpolation process on the differential data, new sampling points t'0 to t'5 are added to the differential data having the original sampling points t0 to t5, and the number of sampling points of the differential data is increased. In this manner, since the number of sampling points of the differential data is increased by the interpolation process, the extractor 15 may accurately determine whether the amplitude of the differential data is minimal, and as a result, the accuracy of extracting the optical phase noise is improved.

Return to the description of FIG. 4. The sign inverter 16 reverses the sign of the first phase data input from the first measurer 11. The sign inverter 16 outputs reversed data obtained by reversing the sign of the first phase data to the selector 17.

The selector 17 receives the optical phase noise from the extractor 15. The selector 17 receives the reversed data from the sign inverter 16. Then, the selector 17 selects any of the optical phase noise and the reversed data based on a selection command from a phase synchronizer 291 included in the simulation controller 29 or from a simulator 292 included in the simulation controller 29 and outputs the selected optical phase noise or the selected reversed data to the electric signal source 18 and the electric signal source 19. The phase synchronizer 291 and the simulator 292 are described later.

The electric signal source 18 generates an electric signal of the optical phase noise input from the selector 17 or generates an electric signal of the reversed data input from the selector 17 and outputs the generated electric signal to the phase modulator 22.

The electric signal source 19 generates an electric signal of the optical phase noise input from the selector 17 or generates an electric signal of the reversed data input from the selector 17 and outputs the generated electric signal to the phase modulator 23.

The optical delay unit 20 adds a delay amount to the non-transferred signal guided by the optical branching unit 3a. The optical delay unit may utilize an optical delay circuit such as an optical fiber. The delay amount to be added to the non-transferred signal by the optical delay unit 20 is adjusted by the phase synchronizer 291 of the simulation controller 29. The optical delay unit 20 outputs the non-transferred signal having the delay amount added thereto to the polarized wave separator (so-called polarization beam splitter) 21.

The polarized wave separator 21 separates the non-transferred signal having the delay amount added thereto by the optical delay unit 20 into two optical signals polarized in directions perpendicular to each other. Hereinafter, one of the two optical signals polarized in the directions perpendicular to each other is referred to as a non-transferred signal of an X polarized wave, and the other of the two optical signals polarized in the directions perpendicular to each other is referred to as a non-transferred signal of a Y polarized wave in some cases. The polarized wave separator 21 outputs the non-transferred signal of the X polarized wave to the phase modulator 22 and outputs the non-transferred signal of the Y polarized wave to the phase modulator 23.

The phase modulator 22 receives the non-transferred signal of the X polarized wave from the polarized wave separator 21. The phase modulator 22 receives the electric signal of the optical phase noise or the electric signal of the reversed data from the electric signal source 18. The electric signal, input from the electric signal source 18, of the optical phase noise or the electric signal, input from the electric signal source 18, of the reversed data is hereinafter referred to as an "input signal" in some cases. The phase modulator 22 uses the signal input from the electric signal source 18 to modulate the phase of the non-transferred signal of the X polarized wave. The phase modulator 22 is an example of an optical modulator.

The phase modulator 23 receives the non-transferred signal of the Y polarized wave from the polarized wave separator 21. The phase modulator 23 receives the electric signal of the optical phase noise or the electric signal of the reversed data from the electric signal source 19. The electric signal, input from the electric signal source 19, of the optical phase noise or the electric signal, input from the electric signal source 19, of the reversed data is hereinafter referred to as an "input signal" in some cases. The phase modulator 23 uses the signal input from the electric signal source 19 to modulate the phase of the non-transferred signal of the Y polarized wave. The phase modulator 23 is an example of the optical modulator.

The polarized wave multiplexer 24 synthesizes the optical signal, output from the phase modulator 22, of the X polarized wave with the optical signal, output from the phase modulator 23, of the Y polarized wave, while a polarization direction of the X polarized wave is perpendicular to a polarized direction of the Y polarized wave. Then, the polarized wave multiplexer 24 outputs an optical signal obtained by synchronizing the optical signals with each other to the optical branching unit 25.

The optical branching unit 25 guides the optical signal input from the polarized wave multiplexer 24 to the output port 26 and the optical interferometer 27. The output port 26 outputs the optical signal output and guided by the optical branching unit 25 to an external.

The optical interferometer 27 generates light that interferes with non-interfering light and the optical signal output and guided by the optical branching unit 25. Then, the optical interferometer 27 outputs the generated interfering light to the photoelectric converter 28.

Figure 9:
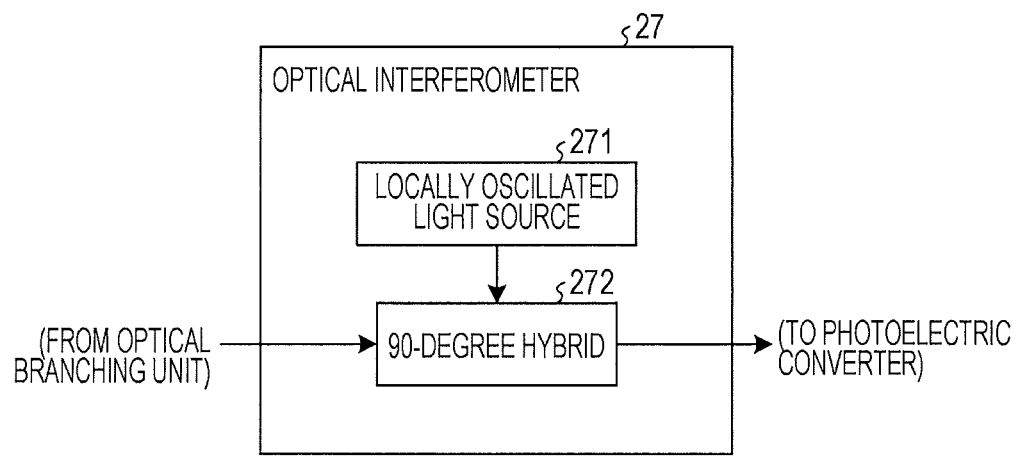
FIG. 9 is a diagram illustrating an example of a configuration of an optical interferometer.
Figure 10:
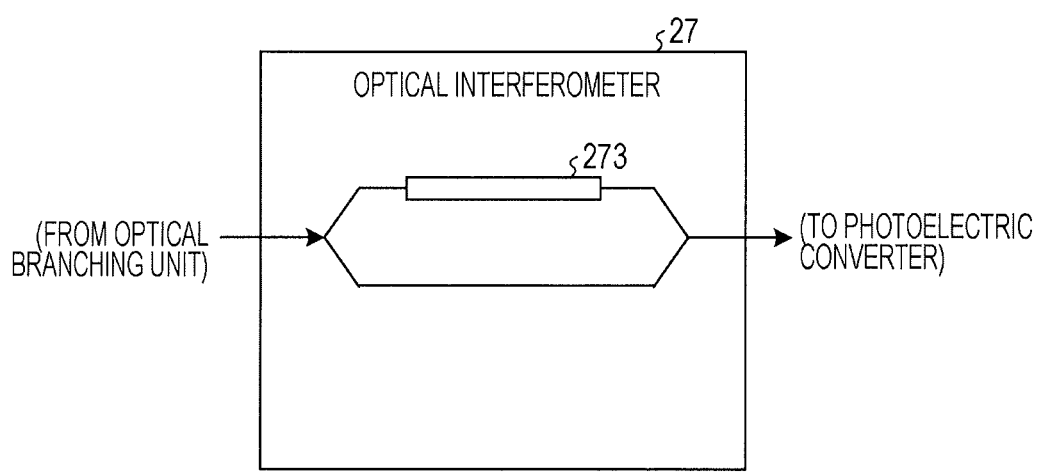
FIG. 10 is a diagram illustrating another example of the configuration of the optical interferometer.

As the optical interferometer 27, an optical interferometer illustrated in FIG. 9 or an optical interferometer illustrated in FIG. 10 is used. FIG. 9 is a diagram illustrating an example of the optical interferometer. The optical interferometer 27 illustrated in FIG. 9 employs an intradyne detection method and includes a locally oscillated light source 271 and a 90-degree hybrid 272. The locally oscillated light source 271 generates locally oscillated light having the same frequency as the frequency of the optical signal output and guided by the optical branching unit 25 and outputs the generated locally oscillated light as the non-interfering light to the 90-degree hybrid 272. The 90-degree hybrid 272 generates light that interferes with the locally oscillated light and the optical signal output and guided by the optical branching unit 25. Then, the 90-degree hybrid 272 outputs the generated interfering light to the photoelectric converter 28.

FIG. 10 is a diagram illustrating another example of the configuration of the optical interferometer. The optical interferometer 27 illustrated in FIG. 10 employs a self-homodyne detection method. The optical interferometer 27 separates the optical signal output and guided by the optical branching unit 25 into two optical signals, causes a delay element 273 to delay one of the optical signals obtained by the separation, and generates light that interferes with the delayed output optical signal and the other output optical signal that is not delayed. Then, the optical interferometer 27 outputs the generated interfering light to the photoelectric converter 28.

The photoelectric converter 28 converts the interfering light input from the optical interferometer 27 into an electric signal and outputs the electric signal of the interfering light to the simulation controller 29.

The simulation controller 29 may include the phase synchronizer 291 and the simulator 292.

The phase synchronizer 291 adjusts the delay amount to be added to the non-transferred signal by the optical delay unit 20 and thereby synchronizes the phase of the non-transferred signal with the phases of the signals to be input to the phase modulators 22 and 23.

In addition, the phase synchronizer 291 determines whether the phase of the non-transferred signal is synchronized with the phases of the signals to be input to the phase modulators 22 and 23, while adjusting the delay amount to be added to the non-transferred signal by the optical delay unit 20. Specifically, the phase synchronizer 291 outputs, to the selector 17, a command to select the reserved data and sets the electric signals of the reserved data as the signals to be input to the phase modulators 22 and 23. Then, the phase synchronizer 291 uses the electric signals of the reversed data to cause the phase modulators 22 and 23 to modulate the phase of the non-transferred signal. The optical signal, output from the phase modulator 22, of the X polarized wave and the optical signal, output from the phase modulator 23, of the Y polarized wave are synthesized by the polarized wave multiplexer 24 and output to the optical branching unit 25. Then, the phase synchronizer 291 uses the optical interferometer 27 to cause the optical signal output and guided by the optical branching unit 25 to interfere with the non-interfering light. The interfering light output from the optical interferometer 27 is converted into the electric signal by the photoelectric converter 28. The interfering light converted into the electric signal is input to the phase synchronizer 291. Then, the phase synchronizer 291 uses the intensity of the interfering light to determine whether the phase of the non-transferred signal is synchronized with the phases of the signals input to the phase modulators 22 and 23.

Figure 11A:
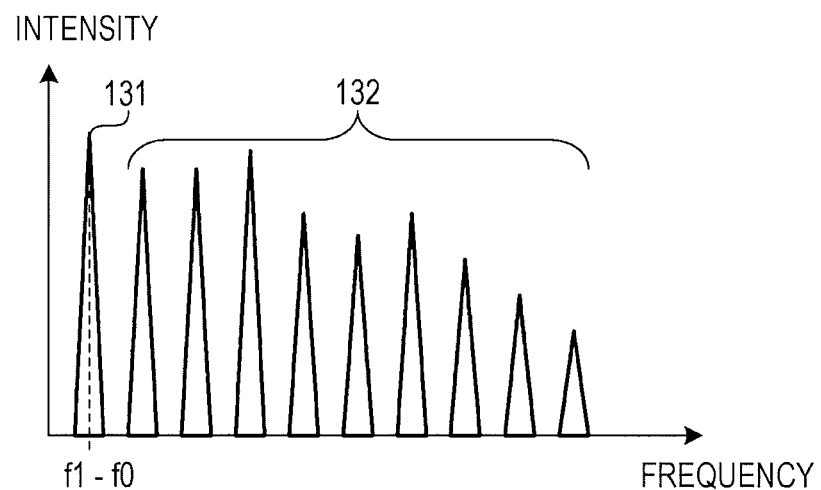
FIG. 11A is a diagram illustrating an example of a graph indicating relationships between the intensity of interfering light and a frequency.
Figure 11B:
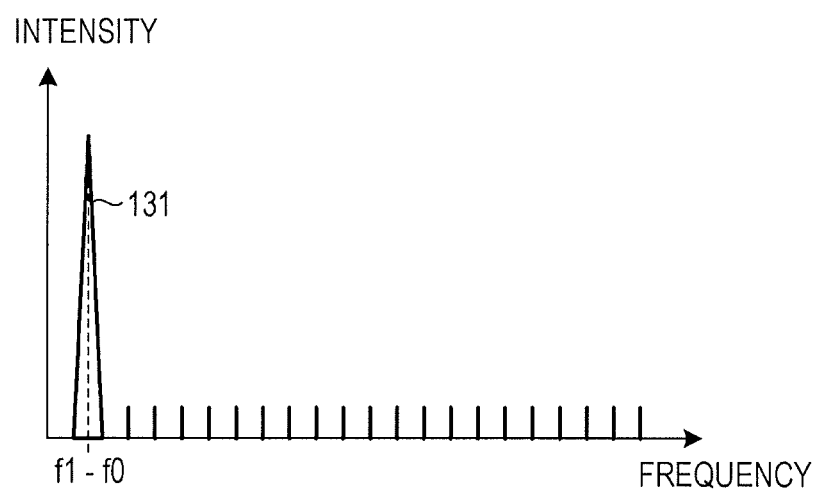
FIG. 11B is a diagram illustrating the example of a graph indicating relationships between the intensity of the interfering light and a frequency.

An example of the determination, made using the intensity of the interfering light, of whether the phases are synchronized with each other is described below with reference to FIGS. 11A and 11B. FIGS. 11A and 11B are diagrams illustrating an example of graphs each indicating relationships between the intensity of the interfering light and a frequency. In each of the graphs illustrated in FIGS. 11A and 11B, the abscissa indicates the frequency, and the ordinate indicates the intensity of the interfering light. The example assumes that the optical interferometer 27 illustrated in FIG. 9 is used as the optical interferometer 27. In addition, the example assumes that the central frequency of the locally oscillated light output from the locally oscillated light source 271 is f0 and that the central frequency of the optical signal output and guided by the optical branching unit 25 is f1.

If the phase of the non-transferred signal is not synchronized with the phases of the signals input to the phase modulators 22 and 23, the optical signal, output from the phase modulator 22, of the X polarized wave and the optical signal, output from the phase modulator 23, of the Y polarized wave each include a frequency component corresponding to the non-transferred signal. Thus, the intensity of the interfering light to be input to the phase synchronizer 291 includes an intensity 131 of a frequency component corresponding to the difference (f1-f0) between the central frequency of the locally oscillated light and the central frequency of the output optical signal and an intensity 132 of a frequency component corresponding to the non-transferred signal, as illustrated in FIG. 11A.

On the other hand, if the phase of the non-transferred signal is synchronized with the phases of the signals input to the phase modulators 22 and 23, the frequency component corresponding to the non-transferred signal is offset by the electric signals, set as the signals to be input, of the reversed data. Thus, the optical signal, output from the phase modulator 22, of the X polarized wave and the optical signal, output from the phase modulator 23, of the Y polarized wave do not include the frequency component corresponding to the non-transferred signal. Specifically, the optical signal, output from the phase modulator 22, of the X polarized wave and the optical signal, output from the phase modulator 23, of the Y polarized wave are continuous light (continuous waves (CW)) whose phases are not modulated or the like. Thus, the intensity of the interfering light to be input to the phase synchronizer 291 includes only the intensity 131 of the frequency component corresponding to the difference (f1-f0) between the central frequency of the locally oscillated light and the central frequency of the output optical signal, as illustrated in FIG. 11B. If the intensity of the interfering light does not include the intensity of the frequency component corresponding to the non-transferred signal, the phase synchronizer 291 determines that the phase of the non-transferred signal is synchronized with the phases of the signals input to the phase modulators 22 and 23.

Figure 12A:
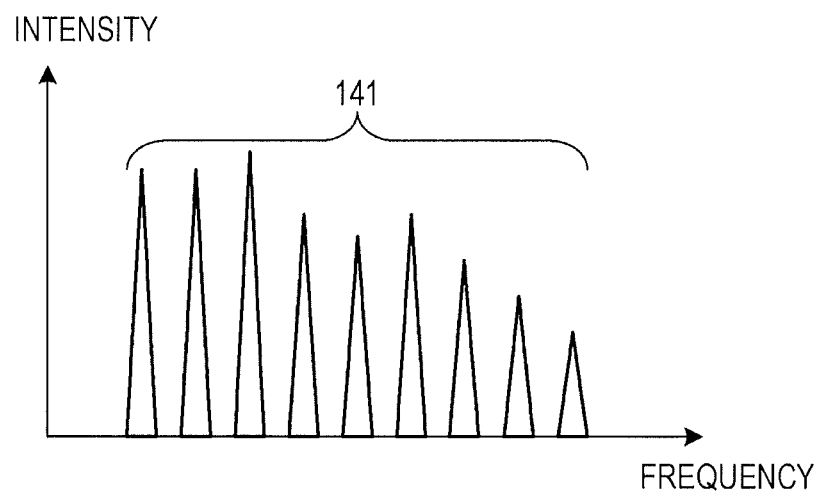
FIG. 12A is a diagram illustrating another example of a graph indicating relationships between the intensity of interfering light and a frequency.
Figure 12B:
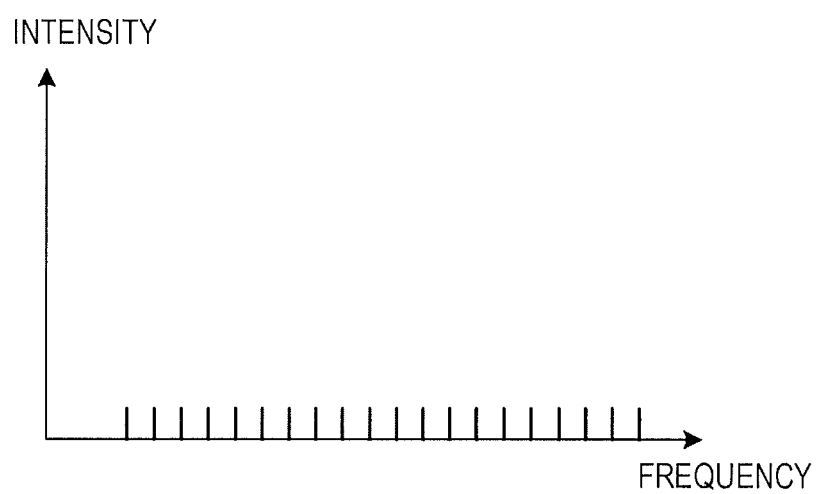
FIG. 12B is a diagram illustrating the other example of a graph indicating relationships between the intensity of the interfering light and a frequency.

Next, another example of the determination, made using the intensity of the interfering light, of whether the phases are synchronized with each other is described with reference to FIGS. 12A and 12B. FIGS. 12A and 12B are diagrams illustrating another example of graphs each indicating relationships between the intensity of the interfering light and a frequency. In each of the graphs illustrated in FIGS. 12A and 12B, the abscissa indicates the frequency, and the ordinate indicates the intensity of the interfering light. The example assumes that the optical interferometer 27 illustrated in FIG. 10 is used as the optical interferometer 27.

If the phase of the non-transferred signal is not synchronized with the phases of the signals input to the phase modulators 22 and 23, the optical signal, output from the phase modulator 22, of the X polarized wave and the optical signal, output from the phase modulator 23, of the Y polarized wave each include the frequency component corresponding to the non-transferred signal. Thus, the intensity of the interfering light to be input to the phase synchronizer 291 includes an intensity 141 of the frequency component corresponding to the non-transferred signal, as illustrated in FIG. 12A.

On the other hand, if the phase of the non-transferred signal is synchronized with the phases of the signals input to the phase modulators 22 and 23, the frequency component corresponding to the non-transferred signal is offset by the electric signals, set as the signals to be input, of the reserved data. Thus, the optical signal, output from the phase modulator 22, of the X polarized wave and the optical signal, output from the phase modulator 23, of the Y polarized wave do not include the frequency component corresponding to the non-transferred signal. Specifically, the optical signal, output from the phase modulator 22, of the X polarized wave and the optical signal, output from the phase modulator 23, of the Y polarized wave are continuous light (continuous waves (CWs) whose phases are not modulated or the like. Thus, the intensity of the interfering light to be input to the phase synchronizer 291 does not include the intensity 141 of the frequency component corresponding to the non-transferred signal, as illustrated in FIG. 12B. If the intensity of the interfering light does not include the intensity of the frequency component corresponding to the non-transferred signal, the phase synchronizer 291 determines that the phase of the non-transferred signal is synchronized with the phases of the signals input to the phase modulators 22 and 23.

Return to the description of FIG. 4. If the phase of the non-transferred signal is synchronized with the phases of the signals input to the phase modulators 22 and 23, the simulator 292 outputs, to the selector 17, a command to select the optical phase noise and thereby sets the electric signals of the optical phase noise as the signals to be input to the phase modulators 22 and 23. Then, the simulator 292 uses the electric signals of the optical phase noise to cause the phase modulators 22 and 23 to modulate the phase of the non-transferred signal and thereby simulates the transferred signal having the optical phase noise superimposed thereon. Since the phase of the non-transferred signal is synchronized with the phases of the signals input to the phase modulators 22 and 23, the phase of the non-transferred signal is accurately modulated using the electric signals of the optical phase noise, and as a result, the transferred signal having the optical phase noise superimposed thereon is accurately simulated. The transferred signal simulated by the simulator 292 is output from the phase modulators 22 and 23 as the signal, output from the phase modulator 22, of the X polarized wave and the signal, output from the phase modulator 23, of the Y polarized wave, passes through the polarized wave multiplexer 24 and the optical branching unit 25, and is output from the output port 26.

Next, a process of extracting the optical phase noise by the optical phase noise extracting device 10 according to the embodiment is described with reference to FIG. 13. FIG. 13 is a flowchart of a procedure for the process of extracting the optical phase noise by the optical phase noise extracting device according to the embodiment.

As illustrated in FIG. 13, the first measurer 11 measures the first phase data indicating the temporal variation in the phase of the non-transferred signal (in step S101). The second measurer 12 measures the second phase data indicating the temporal variation in the phase of the transferred signal (in step S102).

The subtractor 14 generates the differential data indicating the difference between the first phase data and the second phase data (in step S103).

The extractor 15 monitors the differential data input from the subtractor 14 while adjusting the delay amount to be added to the first phase data by the delay unit 13 (in step S104). If the amplitude of the differential data is not minimal (No in step S105), the extractor 15 causes the process to return to step S104.

On the other hand, if the amplitude of the differential data is minimal (Yes in step S105), the extractor 15 reverses the sign of the differential data (in step S106), extracts the reversed differential data as the optical phase noise (in step S107), and terminates the process.

Next, a process of simulating the transferred signal by the optical phase noise extracting device 10 according to the embodiment is described with reference to FIG. 14. FIG. 14 is a flowchart of a procedure for the process of simulating the transferred signal by the optical phase noise extracting device according to the embodiment.

As illustrated in FIG. 14, the phase synchronizer 291 outputs the command to select the reversed data to the selector 17 and sets the electric signals of the reversed data as the signals to be input to the phase modulators 22 and 23 (in step S201).

The phase synchronizer 291 uses the electric signals of the reversed data to cause the phase modulators 22 and 23 to modulate the phase of the non-transferred signal (in step S202). The signal, output from the phase modulator 22, of the X polarized wave and the signal, output from the phase modulator 23, of the Y polarized wave are synthesized by the polarized wave multiplexer 24 and output to the optical branching unit 25. The phase synchronizer 291 uses the optical interferometer 27 to cause the optical signal output and guided by the optical branching unit 25 and the non-interfering light to interfere with each other. The interfering light output from the optical interferometer 27 is converted into the electric signal by the photoelectric converter 28. The interfering light converted into the electric signal is input to the phase synchronizer 291.

The phase synchronizer 291 acquires the intensity of the interfering light output from the optical interferometer 27 (in step S203).

The phase synchronizer 291 determines whether the intensity of the interfering light includes the intensity of the frequency component corresponding to the non-transferred signal (in step S204). If the intensity of the interfering light includes the intensity of the frequency component corresponding to the non-transferred signal (Yes in step S204), the phase synchronizer 291 determines that the phase of the non-transferred signal is not synchronized with the phases of the signals input to the phase modulators 22 and 23 (in step S205). Then, the phase synchronizer 291 adjusts the delay amount to be added to the non-transferred signal by the optical delay unit 20 (in step S206) and causes the process to return to step S203.

On the other hand, if the intensity of the interfering light does not include the intensity of the frequency component corresponding to the non-transferred signal (No in step S204), the phase synchronizer 291 determines that the phase of the non-transferred signal is synchronized with the phases of the signals input to the phase modulators 22 and 23 (in step S207).

Subsequently, the simulator 292 outputs the command to select the optical phase noise to the selector 17 and thereby sets the electric signals of the optical phase noise as the signals to be input to the phase modulators 22 and 23 (in step S208).

The simulator 292 uses the electric signals of the optical phase noise to cause the phase modulators 22 and 23 to modulate the phases of the non-transferred signals and thereby simulates the transferred signal having the optical phase noise superimposed thereon (in step S209).

In the aforementioned manner, the optical phase noise extracting device 10 according to the embodiment uses the differential data indicating the difference between the first phase data indicating the temporal variation in the phase of the non-transferred signal and the second phase data indicating the temporal variation in the phase of the transferred signal and extracts the optical phase noise generated due to the nonlinear optical effect of the optical transmission path 3. Thus, according to the embodiment, the optical phase noise generated due to the nonlinear optical effect of the optical transmission path 3 may be accurately extracted. In addition, according to the embodiment, since the optical phase noise may be extracted without interruption of the transfer of the optical signal in the optical transmission path 3, a loss that is caused by the stop of a service using optical signals may be avoided.

In addition, the optical phase noise extracting device 10 according to the embodiment sets the electric signals of the optical phase noise as the signals to be input to the phase modulators 22 and 23, while the phase of the non-transferred signal is synchronized with the phases of the signals to be input to the phase modulators 22 and 23. Then, the optical phase noise extracting device 10 according to the embodiment causes the phase modulators 22 and 23 to modulate the phase of the non-transferred signal. Thus, according to the embodiment, the transferred signal may be accurately simulated using the electric signals of the optical phase noise and the non-transferred signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An apparatus, comprising:
a first measurer configured to measure first phase data indicating a temporal variation in a phase of a non-transferred signal that is an optical signal modulated by an optical phase modulation scheme and output from a transmitting device to an optical transmission path as the non-transferred signal;
a second measurer configured to measure second phase data indicating a temporal variation in the phase of the optical signal transferred by the optical transmission path as a transferred signal on a side of a receiving device;
a generator configured to generate differential data indicating a difference between the first phase data and the second phase data; and
an extractor configured to use the differential data to extract, from the optical signal on the side of the receiving device, optical phase noise generated due to the optical transmission path, and configured to monitor the differential data and, when an amplitude of the differential data is minimal, extract the optical phase noise by reversing a sign of the differential data.

2. The apparatus according to claim 1, further comprising:
a delay unit configured to add a delay amount to the first phase data,
wherein the generator is configured to generate the differential data indicating the difference between the first phase data having the delay amount added thereto by the delay unit and the second phase data, and
wherein the extractor is configured to monitor the differential data generated by the generator while adjusting the delay amount to be added to the first phase data by the delay unit.

3. The apparatus according to claim 1, further comprising:
an optical modulator configured to modulate the phase of the non-transferred signal using an input signal;
an optical delay unit configured to add a delay amount to the non-transferred signal;
a phase synchronizer configured to synchronize the phase of the non-transferred signal with the phase of the input signal by adjusting the delay amount to be added to the non-transferred signal by the optical delay unit; and
a simulator configured to set an electric signal of the optical phase noise extracted by the extractor as the input signal to be input to the optical modulator in a state in which the phase of the non-transferred signal is synchronized with the phase of the input signal to be input, use the electric signal of the optical phase noise to cause the optical modulator to modulate the phase of the non-transferred signal, and thereby simulate the transferred signal having the optical phase noise superimposed thereon.

4. The apparatus according to claim 3,
wherein the phase synchronizer is configured to set an electric signal of reversed data obtained by reversing a sign of the first phase data as the input signal to be input to the optical modulator, use the electric signal of the reversed data to cause the optical modulator to modulate the phase of the non-transferred signal, use an optical interferometer to cause an optical signal output from the optical modulator to interfere with non-interfering light, and use an intensity of interfering light output from the optical interferometer to determine whether the phase of the non-transferred signal is synchronized with the phase of the input signal.

5. The apparatus according to claim 4,
wherein when the intensity of the interfering light output from the optical interferometer does not include the intensity of a frequency component corresponding to the non-transferred signal, the phase synchronizer determines that the phase of the non-transferred signal is synchronized with the phase of the input signal.

6. An optical phase noise extraction method comprising:
measuring first phase data indicating a temporal variation in a phase of a non-transferred signal that is an optical signal modulated by an optical phase modulation scheme and output to an optical transmission path;
measuring second phase data indicating a temporal variation in the phase of the optical signal transferred by the optical transmission path as a transferred signal on a side of a receiving device;
generating differential data indicating the difference between the first phase data and the second phase data;
using the differential data to extract, from the transferred signal, optical phase noise generated due to a nonlinear optical effect of the optical transmission path; and
monitoring the differential data and, when an amplitude of the differential data is minimal, extracting the optical phase noise by reversing a sign of the differential data.

* * * * *